L. DINESEN.
VALVE MECHANISM FOR MILKING APPARATUS.
APPLICATION FILED JUNE 9, 1919.
1,408,694.
Patented Mar. 7, 1922.
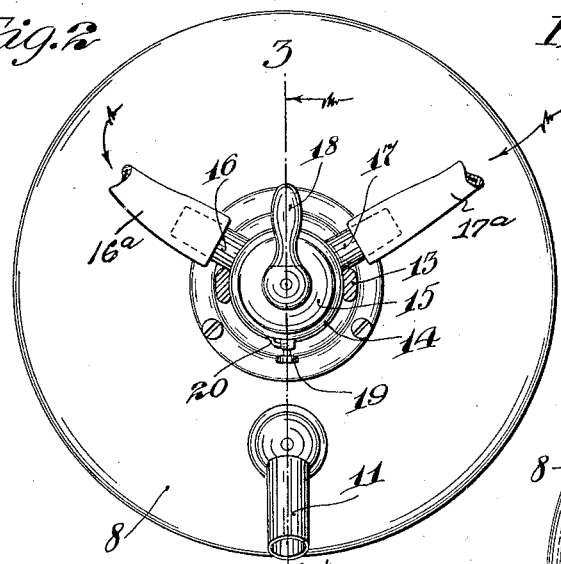
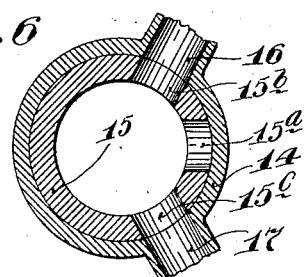
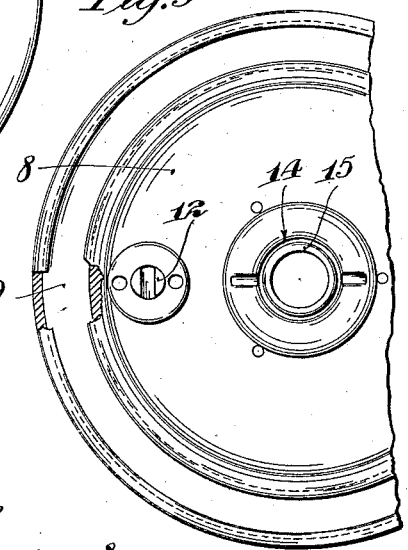
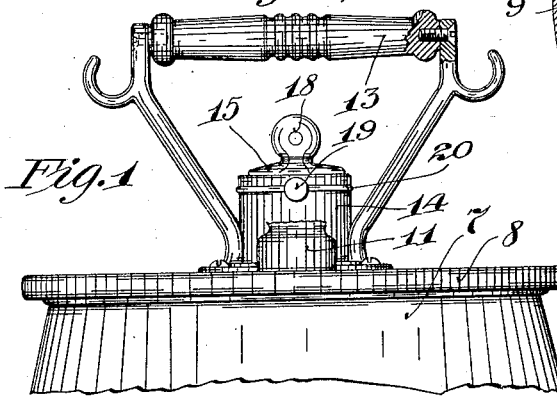
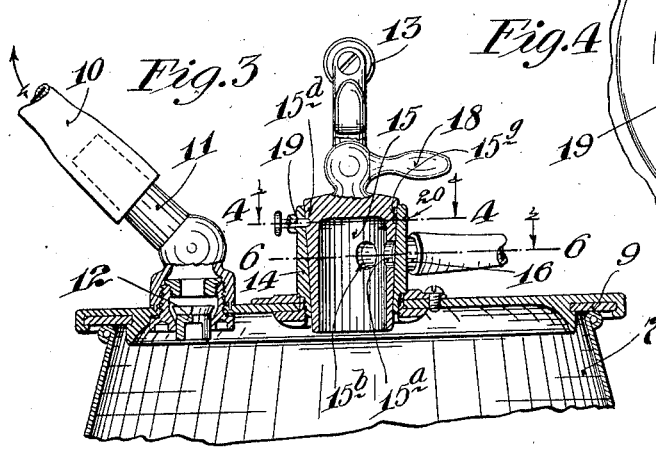
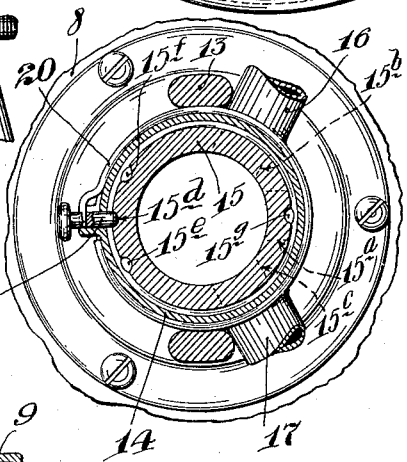
Inventor
Laurits Dinesen
By his Attorneys

UNITED STATES PATENT OFFICE.

LAURITS DINESEN, OF MINNEAPOLIS, MINNESOTA, ASSIGNOR, BY MESNE ASSIGNMENTS, TO PERFECTION MANUFACTURING COMPANY, OF MINNEAPOLIS, MINNESOTA, A CORPORATION OF MINNESOTA.

VALVE MECHANISM FOR MILKING APPARATUS.

1,408,694.      Specification of Letters Patent.      Patented Mar. 7, 1922.

Application filed June 9, 1919. Serial No. 302,691.

*To all whom it may concern:*

Be it known that I, LAURITS DINESEN, a citizen of the United States, residing at Minneapolis, in the county of Hennepin and State of Minnesota, have invented certain new and useful Improvements in Valve Mechanism for Milking Apparatus; and I do hereby declare the following to be a full, clear, and exact description of the invention, such as will enable others skilled in the art to which it appertains to make and use the same.

This invention has for its object to provide an improved valve mechanism for milking apparatus of the type wherein a partial vacuum is maintained in a milk can or receptacle, and which can or receptacle is, by different milk delivery tubes, connected to two different groups of teat-cups, so that two cows may be milked at one time.

In a milking apparatus of this kind it is sometimes desirable to cut one of the milk tubes out of action, so that only one cow will be milked at that particular time; but at other times it is desirable to have the apparatus connected to simultaneously milk both cows. It is highly desirable to be able to quickly cut out both of the milk tubes, so that neither of the teat-cup groups will be connected for action.

My invention provides an extremely simple so-called quick valve for the above purpose; and to the above end generally stated the invention consists of the novel devices and combinations of devices hereinafter described and defined in the claims.

In the accompanying drawings which illustrate the invention like characters indicate like parts throughout the several views.

Referring to drawings:

Fig. 1 is a side elevation showing the upper portion of the milk pail or receptacle and its cover and illustrating the improved valve applied thereto in accordance with my invention;

Fig. 2 is a plan view of the parts shown in Fig. 1 some portions being projected;

Fig. 3 is a vertical section taken on the line 3—3 of Fig. 2;

Fig. 4 is a horizontal section taken on the line 4—4 of Fig. 3 some portions being broken away;

Fig. 5 is a bottom plan view of the cover and valve mechanism some portions being broken away; and Fig. 6 is a fragmentary view in section on the line 6—6 of Fig. 3.

The pail or milk receptacle is indicated by the numeral 7 and its cover by the numeral 8. The cover 8 has a gasket 9 that makes an air tight joint with the rim of the pail.

A partial vacuum has been contained in the pail 7 through a tube 10 that is connected to a suitable source of partial vacuum such as the vacuum pump or a vacuum tank. This tube 10 is connected to the pail, being as shown directly connected to a nipple 11 that is secured on the pail cover 8 and is provided with an outwardly opening valve 12. The valve 12 will close to prevent air from coming into the pail through the tube 10 but will open to permit air to be pumped or drawn out of the pail through the tube 10. The cover 8 is shown as provided with a suitable handle 13.

The improved so-called switch valve 15 comprises a cylindrical valve seat 14, the interior of which is downwardly tapered and opens through the cover 8 into the interior of the pail. As shown, the lower end of the valve seat 14 is reduced and threaded and is provided with an annular clamping nut that clamps the under side of the pail to securely but detachably hold the said valve seat in a working position at the central portion of the cover 8.

Valve seat 14 is provided with two radially projected nipples 16 and 17. These nipples 16 and 17 will, in practice, be connected one to each of the groups of teat-cups through flexible milk tubes 16$^a$ and 17$^a$.

The valve 15 that works in the seat 14 is hollow and is closed at its upper ends but at its lower ends opens into the interior of the pail. This valve 15 is tapered to closely fit the valve seat. At its upper ends the said valve is provided with a projecting hand beam 18, by means of which it may be freely oscillated. Valve 15 is provided with three radial ports 15$^a$, 15$^b$, and 15$^c$.

As valve 15 is downwardly tapered and open at its lower end to the interior of the can or pail 7, it will be drawn against its seat by the partial vacuum or suctions from within said paid.

This valve 15, set in the position shown in Fig. 2 both of the nipples 16 and 17, will be open to the interior of the milk can, and hence, both groups of teat-cups will be in action. When valve 15 is moved so as to bring part 15ᵃ into registration with nipple 16 one of these milk tubes and hence one group fixed up will be connected with interior of the pail while the other tube, that is, the one that is connected with the nipple 17 will be cut out of action. When valve 15 is oscillated so as to move part 15ᵃ into registration with nipple 17 the first noted milk tube will be cut out of action and the second noted milk tube will be cut into action. When valve 15 is oscillated through 180 degrees then both of these nipples 16 and 17 will be closed or cut off from the milk pail and both groups of teat-cups will then, of course, be cut out of action. Here it will be noted that all of the parts 15ᵃ, 15ᵇ, and 15ᶜ are on one side of the diametrical line drawn through the axis of valve 15 or in other words, all within less than 180 degrees of the circumference of said valve.

To assist the operator in determining the exact position of the valve, said valve is shown as provided with indentations 15ᵈ, 15ᵉ, 15ᶠ, 15ᵍ, see Fig. 4; and for engagement with these indentations, valve seat 14 is provided with the readily movable pin 19, the inner end of which is rounded so that it will be cammed out of engagement with the indentations when any considerable force is applied to the valve 15. For yieldingly pressing the pin 19 inward, a split spring band 20 is applied around the valve seat and one end thereof is inserted into a perforation of said pin, as best shown in Figs. 3 and 4.

What I claim is:

1. The combination with a milk can in which a partial vacuum is maintained, of a valve casing opening into said can, said valve casing having a plurality of milk delivery ports, and a switch valve working in said casing, said valve being port-equipped for connecting the ports of said casing to the interior of said can, said valve being movable into one position to close all of said milk delivery ports, into another position to open all thereof to the interior of the can, and into other positions to open, at will, either of said milk delivery ports into interior of said can.

2. The combination with a milk can in which a partial vacuum is maintained, of a valve casing into said can, said valve casing having a plurality of milk delivery ports, and a switch valve working in said casing, said valve being port-equipped for connecting the ports of said casing to the interior of said can, said valve being rotatable into one position to close all of said milk delivery ports, into another position to open all thereof to the interior of the can, and into other positions to open, at will, either of said milk delivery ports into interior of said can, the said valve being held to its seat by partial vacuum from within said can.

3. The combination with a milk can in which a partial vacuum is maintained, said can having an air tight removable cover, a sleeve like valve casing applied to and opening through said cover, said casing having two milk delivery ports, a hollow switch valve having a tapered exterior seated in said casing and open at its lower ends to the interior of said can, said valve having three circumferentially spaced ports, said valve being movable into one position to close both of said milk delivery ports, into another position to open said milk delivery ports, and into other positions to open, at will, either of the said milk delivery ports while the other is closed.

4. The combination with a milk can in which a partial vacuum is maintained, said can having an air tight removable cover, a valve casing applied to and opening through said cover, said casing having two milk delivery ports, a hollow switch valve having a tapered exterior seated in said casing and open at its lower ends to the interior of said can, said valve having three circumferentially spaced ports, said valve being movable into one position to close both of said milk delivery ports, into another position to open said milk delivery ports, and into other positions to open, at will, either of the said milk delivery ports, while the other is closed, and a yielding device operative on said valve to lightly hold the same in its above noted positions.

In testimony whereof I affix my signature in presence of two witnesses.

LAURITS DINESEN.

Witnesses:
BERNIA G. BAUMANN,
HARRY D. KILGORE.